United States Patent

Gertz et al.

[11] Patent Number: 6,059,522
[45] Date of Patent: May 9, 2000

[54] COMPRESSOR STALL DIAGNOSTICS AND AVOIDANCE

[75] Inventors: Jeffrey B. Gertz, West Simsbury; Om Parkash Sharma, Vernon; Kevin M. Eveker, Marlborough; Carl N. Nett, Tolland; Daniel L. Gysling, Manchester; Matthew R. Feulner, Tolland, all of Conn.

[73] Assignee: United Technologies Corporation, East Hartford, Conn.

[21] Appl. No.: 08/809,497
[22] PCT Filed: Apr. 17, 1996
[86] PCT No.: PCT/US96/05309
  § 371 Date: Sep. 24, 1997
  § 102(e) Date: Sep. 24, 1997
[87] PCT Pub. No.: WO96/34207
  PCT Pub. Date: Oct. 31, 1996
[51] Int. Cl.[7] .............................. F04D 27/00; F02C 3/04
[52] U.S. Cl. .................. 415/1; 415/27; 60/39.29
[58] Field of Search ................................ 60/39.27, 39.29; 415/1, 26, 27

[56] References Cited

U.S. PATENT DOCUMENTS

| | | | |
|---|---|---|---|
| 4,968,215 | 11/1990 | Blotenberg | 415/27 |
| 5,195,875 | 3/1993 | Gaston | 415/27 |
| 5,726,891 | 3/1998 | Sisson et al. | 415/27 |

*Primary Examiner*—Louis J. Casaregola

[57] ABSTRACT

A pressure sensor (12) is located in the compressor stage of a gas turbine engine (10) to provide a pressure signal (PR1) that shows the compressor flow characteristics. The pressure signal (PR1) is applied to a bandpass filter (16) with roll-offs above and below N2. The difference between the filter output and a stored value for the pressure signal is integrated, and compressor bleed valves (18) are opened if the integral exceeds a stored threshold. The health of a compressor stage is determined by analyzing the magnitude of compressor pressure variations at N2 while accelerating the engine and by comparing the magnitude with values obtained from a compressor with a known stall margin.

13 Claims, 8 Drawing Sheets

COMPRESSOR STALL DIAGNOSTICS AND AVOIDANCE

TECHNICAL FIELD

This invention relates to techniques for diagnosing and avoiding stall in rotary compressors, such as aircraft jet engines.

BACKGROUND OF THE INVENTION

In a dynamic rotary compressor operating under normal, stable flow conditions, the flow through the compressor is essentially uniform around the annulus, i.e., it is axisymmetric, and the annulus-averaged flow rate is steady. Generally, if the compressor is operated too close to the peak pressure rise on the compressor pressure rise versus mass flow, constant speed performance map, disturbances acting on the compressor may cause it to encounter a region on the performance map in which fluid dynamic instabilities develop, known as rotating stall and/or surge. This region is bounded on the compressor performance map by the surge/stall line. The instabilities degrade the performance of the compressor and may lead to permanent damage, and thus they should be avoided.

Rotating stall can be viewed as a two-dimensional phenomena that produces a localized region of reduced or reversed flow through the compressor that rotates around the annulus of the flow path. The region is termed a "stall cell" and typically extends axially through the compressor. Rotating stall produces reduced output (as measured in annulus-averaged pressure rise and mass flow) from the compressor. In addition, as the stall cell rotates around the annulus it loads and unloads the compressor blades and may induce blade fatigue failure. Surge is a one-dimensional phenomena defined by oscillations in the annulus-averaged flow through the compressor. Under severe surge conditions, reversal of the flow through the compressor may occur. Both types of instabilities should be avoided, particularly in aircraft applications.

In practical applications, the closer the operating point is to the peak pressure rise, the less the compression system can tolerate a given disturbance level without entering rotating stall and/or surge. Triggering rotating stall results in a sudden jump (within 1–3 rotor revolutions) from a state of high pressure rise, efficient, axisymmetric operation to a state of reduced pressure rise, inefficient, non-axisymmetric operation. Returning the compressor to axisymmetric operation (i.e., eliminating the rotating stall region) requires lowering the operating line on the compressor performance map to a point well below the point at which the stall occurred. In practical applications, the compressor may have to be shut down and restarted to eliminate (or recover from) the stall due to that stall hysteresis. Triggering a surge produces a similar degradation of performance and operability, but surge arises for different reasons.

Because of those potential instabilities, compressors are typically operated with a "stall margin." Stall margin is a measure of the ratio between peak pressure rise, i.e., pressure rise at stall, and the pressure ratio on the operating line of the compressor for the current flow rate. In theory, the greater the stall margin, the larger the disturbance that the compression system can tolerate before entering stall and/or surge. Thus, a compressor design objective is to incorporate enough stall margin to avoid operating in a condition in which an expected disturbance is likely to trigger stall and/or surge. In gas turbine engines used to power aircraft, stall margins of fifteen to thirty percent are common. Since operating the compressor at less than peak pressure rise carries with it a reduction in operating efficiency and performance, there is a trade off between stall margin and performance. Stall margin can be reduced by engine operating conditions, for instance aircraft pitch and yaw and acceleration (conditions that momentarily change increase current pressure) and over time from component wear, for instance enlarged distances between compressor blade tips and the compressor end wall.

DISCLOSURE OF THE INVENTION

An object of the present invention is to avoid compressor stall, especially in aircraft jet engines.

Another object of the present invention is diagnosing a change in base-line stall margin of a rotary compressor for repair and service.

Another object is reliably comparing the stall margin of a compressor with other compressors.

According to the invention, compressor flow is sensed with one or more pressure sensors to produce a signal that passed through a bandpass filter having a lower roll-off between 0.01 and 1 of N2 (compressor rotational frequency) and an upper roll-off between 1 and 10 of N2. The output from the filter is smoothed and compared with a "design value" for compressor flow unsteadiness, producing an error that is integrated. One or more compressor bleed valves are opened when the integral exceeds a preset threshold.

According to the invention, compressor bleed valves are opened for a fixed duration when the threshold is exceeded.

According to the invention, when the threshold is exceeded and the bleed valves are opened the design value is temporarily changed (e.g., reduced) until the bleed valves close.

A feature of the invention, stemming from the invention's capability of detecting very early signs of rotating stall, is that a stall controller employing the invention can be used to improve operation of a compression (pumping) system having a compressor susceptible to rotating stall under certain circumstances. A feature of the invention is that it can be used in gas turbine engines and cooling systems, such as some air conditioning systems or refrigeration systems.

According to the invention, the general "health" of a compression system can be diagnosed by inserting a probe into the compressor flow path and viewing the output signal from a pressure probe that responds to the pressure in the probe for the signal characteristics at the rotor frequency or N2. For example, according to the invention, the engine on a parked aircraft can be tested by inserting the probe into a compressor bore hole and viewing on a signal analyzer the magnitude of the signal fluctuations from the probe pressure at N2 as the engine is accelerated and decelerated. The magnitude of the signals at N2 can be compared to known values (base-line signal values) for the compressor, indicating a change in stall margin or compared to the values for other compressors, which can provide an indication of relative stall susceptibility.

A feature of the invention is the capability of detecting reduced stall margin as compressor components wear of time and establishing a compressor base-line characteristic that can be rechecked during routine engine and aircraft maintenance and compared with other compressors.

The foregoing and other objects, features and advantages of the present invention will become more apparent from the following description and drawings.

BEST MODE FOR CARRYING OUT THE INVENTION

Active Stall Avoidance

Figure 1:
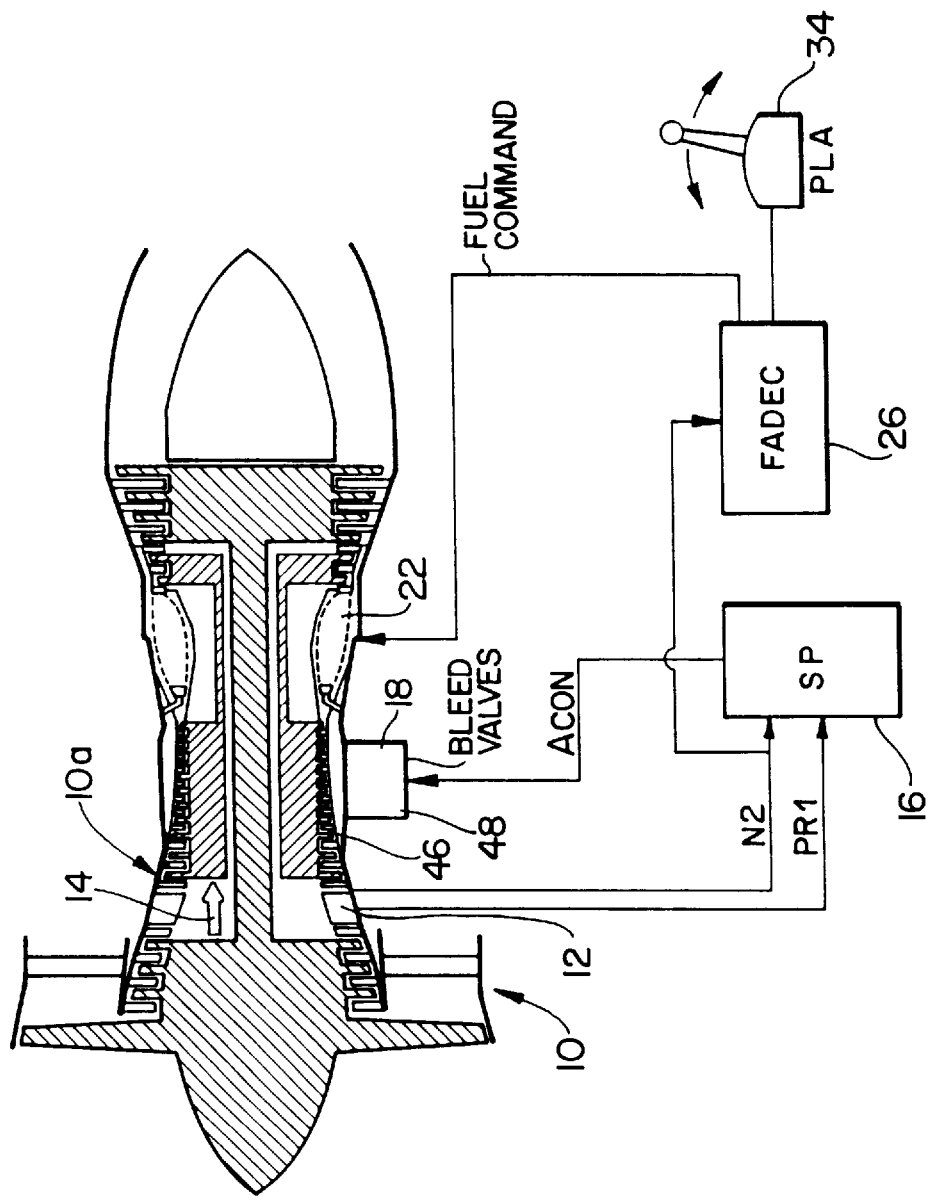
FIG. 1 is a functional diagram of a gas turbine engine employing a static pressure sensor and signal processor to control the opening and closing of compressor bleed valves to avoid stall using the time varying output from the pressure sensor according to the present invention.

FIG. 1 shows a bypass gas turbine turbofan engine 10 that uses a static pressure sensor 12 to provide a signal PR1 with characteristics of the compressor flow 14 present at a compressor stage location, for example between the eight and ninth compressor stages. The signal PR1 is supplied to a signal processor (SP) 16, which can be assumed to include a central processing unit and associated memory programmed to cyclically perform computation steps using the signal PR1 and the control/transfer functions 20, 22, 24 and 26 in FIG. 2 to produce a signal $A_{con}$. The invention may be used to "ground test" an aircraft engine not having the permanent sensor 12, as explained in the diagnostic section in this description. For that purpose, the engine contains a borescope inspection port 10a (known in the art for visually inspecting the compressor) at one or more compressor stages to sensor the compressor flow pressure.

The signal processor also receives a compressor speed (N2) signal, which represents the compressor rotational speed or frequency (i.e., rotor frequency). The signal $A_{con}$ controls the opening of compressor bleed valves 18 using the following control law, which will be explained in more detail using the software function block diagrams in FIG. 2 and FIG. 3:

$$K_3 \int (\alpha_k - \alpha_1) dt \Big|_o^{\alpha max} \qquad \text{Equation 1}$$

In this equation 1, $\alpha_1$=an instantaneous level of unsteadiness in flow properties as manifested in the pressure signal PR1 and $\alpha_k$ is a stored or "design" value for the instantaneous level of unsteadiness.

In FIG. 1, a so-called "FADEC" or "Full Authority Digital Electronic Control" 28 controls fuel flow to the engine combustors 30 as a function of a power lever advance PLA at a cockpit located power control 32. The fuel control may be assumed to include a signal processor for controlling the fuel flow based on a variety of engine operating parameters and, while a separate signal processor 16 to carry out the special sequences associated with the invention has been shown, it is conceivable that a FADEC can be programmed to perform those operations and produce the $A_{con}$ signal to control the bleed valves 18.

Figure 2:
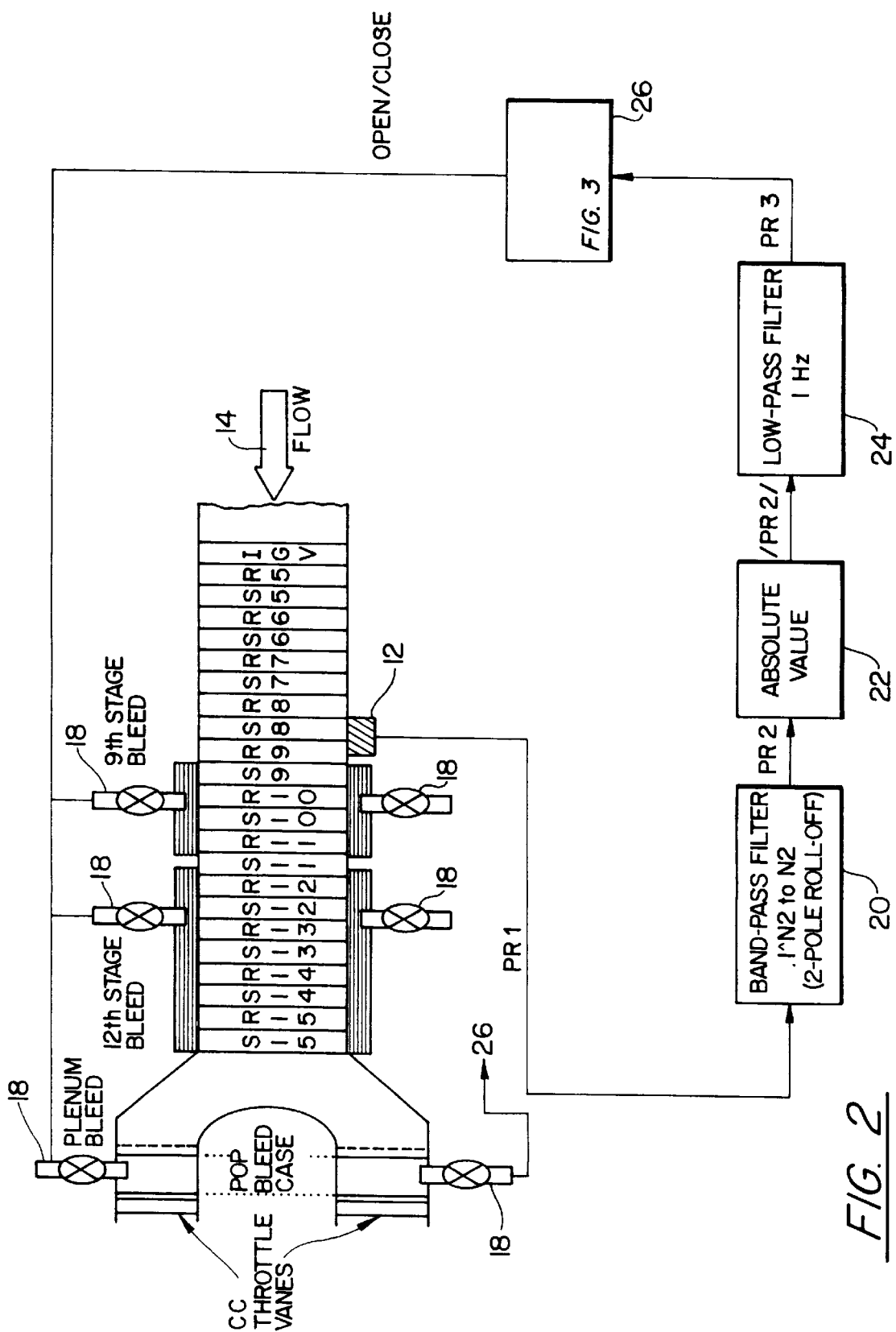
FIG. 2 shows various compressor stages, compressor flow static pressure sensors, bleed valve locations and signal processing steps to control the opening and closing of the bleed valves according to the present invention.
Figure 3:
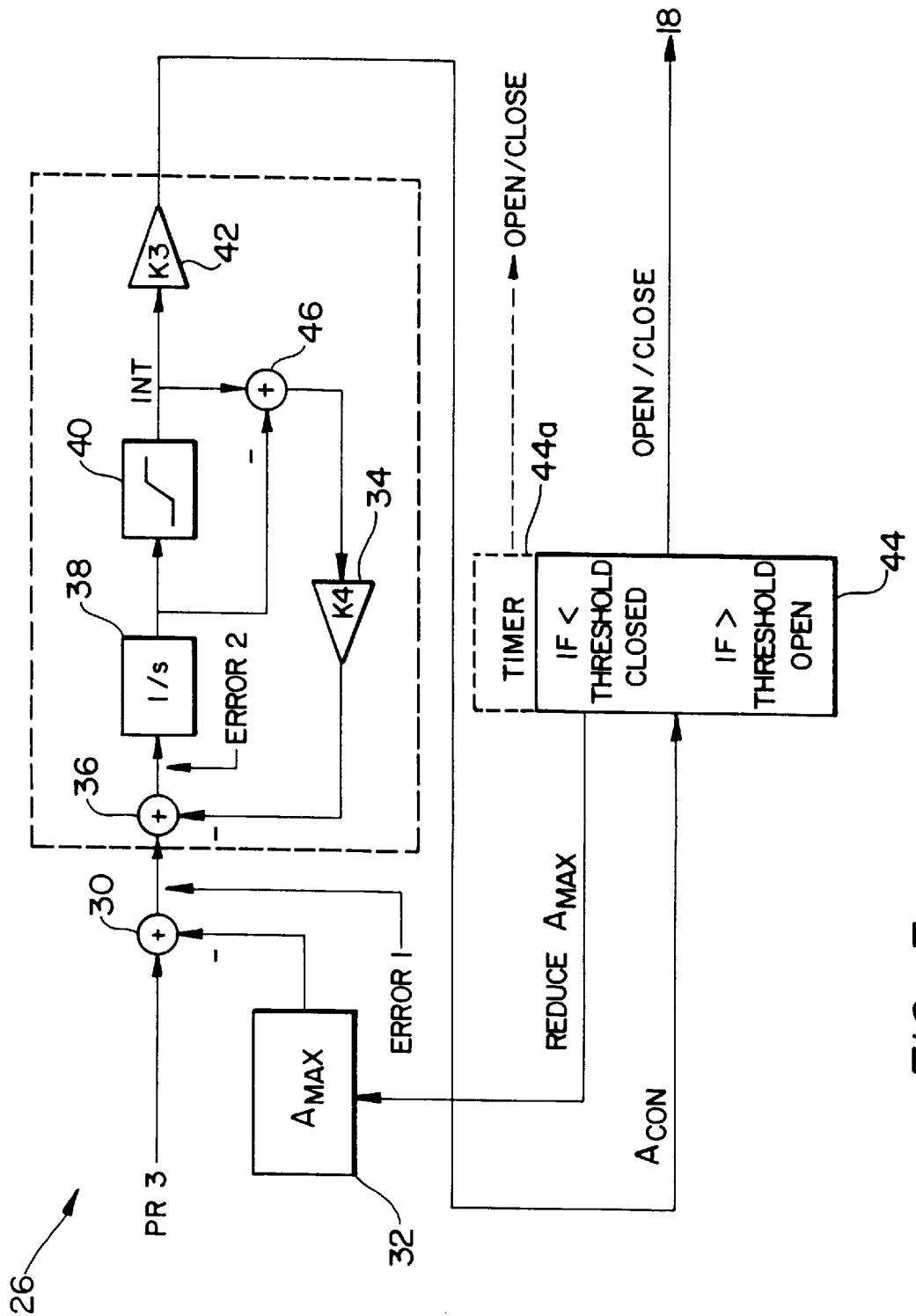
FIG. 3 shows transfer functions or operations used in one of the steps shown in FIG. 2.

Referring to FIG. 2, it can be observed that a compressor includes a plurality of stages, that the bleed valves 18 are selectively located at certain stages and that the static pressure sensor 12 is ahead of those stages (upstream in the compressor flow), although in some applications the sensor or sensors 12 may be located behind (downstream) from the bleed valves 18. It should be assumed that the signal processor 16 is programmed to carry out steps that achieve the functions of blocks 20, 22, 24 and 26. The pressure signal PR1, produced by the sensor 12, will have a time varying characteristic, creating a compressor flow 14 signature, including an indication of the flow unsteadiness along with flow and sensor noise. The pressure signal PR1 is narrowly filtered at block 20, the bandpass frequency ranging from 0.1N2 to N2 with 2-pole roll-offs at the upper and lower frequencies. An effect is smoothing the signal PR1. The output from the filter function 20, signal PR2, is used in an absolute value 22 function to produce absolute value signal PR2 for the spectrum of information passed through the filter function 20. To remove undesirable noise in the signal PR2, the output from the block 22 is applied to a low pass filter with a roll off at 1 Hz, producing the signal PR3, which in effect is measure of the unsteady flow condition associated with an imminent compressor stall, in other words remaining stall margin. The next block 26 starts the operations shown in FIG. 3. At operation 30 the precursor PR3 is subtracted from a stored value $A_{max}$ (block 32), which is a maximum or design value for the precursor and if exceeded manifests an unstable compressor flow in the value of signal Error1. Assuming that the output from scaling block 34 is zero, the output, Error 2, from a second summer 36 would be Error1. The value for Error 2 is integrated at operation 38. The output from the integration step is limited at operation 40 and the output $A_{int}$ (from the limiter 40) is scaled with operation 42, producing the bleed control output signal $A_{con}$. At the logic operation 44, the bleed valves 18 are commanded to open completely if $A_{con}$ has exceeded a stored threshold; otherwise, the bleed valves 18 remain completely closed. The block 44 should be capable of performing either of the following operations once the bleed valves are opened. It can provide a signal to reduce the value of $A_{max}$ slightly, e.g., by 10 percent while the bleed valves are open and return $A_{max}$ to its full value when the bleed valves close again (the open signal is discontinued). Alternatively, as shown by the dotted block, a timer function 44a can be employed to open the bleed values for a fixed interval when the $A_{con}$ signal is produced. The output from the operation 40 is subtracted from the output from the integrator operation 38 at summer 46, and the error from the summer 46 is scaled with operation 34 and applied to the summer 36, which reduces Error2, preventing the integrator operation from "winding up" beyond the value of $A_{int}$ over time. It can be appreciated that the bleed valves 18 will rapidly open when the precursor (signal PR1) indicates a flow condition near the stall boundary; that is, the time varying flow characteristics, normally found at the early stages of a rotating stall, are within the bandwidth of filter 20 and last long enough for $A_{con}$ to exceed the threshold.

Engine Health Diagnostics

Figure 4:
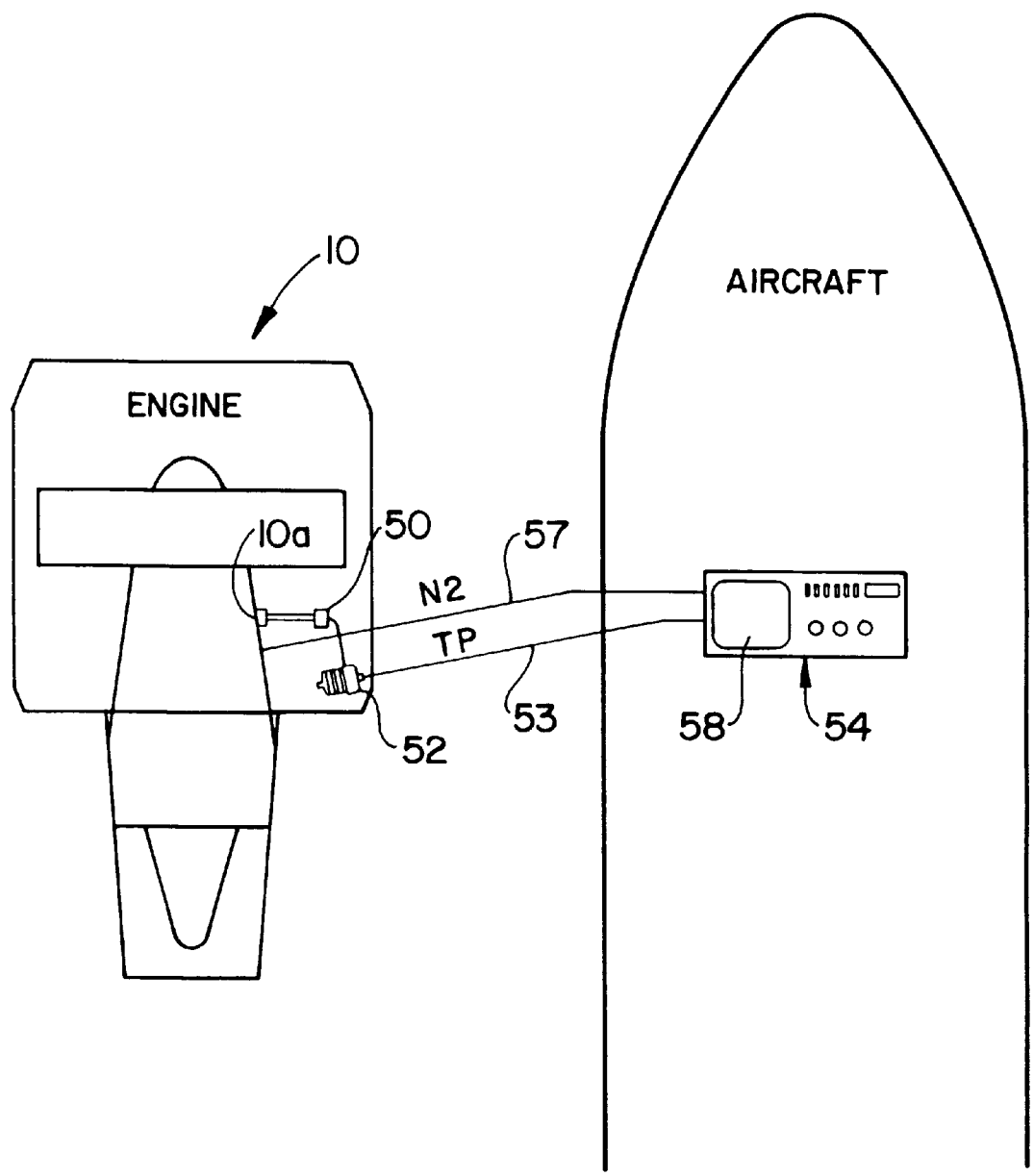
FIG. 4 is a schematic representation of diagnostic equipment used to test a gas turbine engine according to present invention.

Referring to FIG. 4, equipment for performing a diagnostic test on the gas turbine engine 10 on an aircraft includes a probe 50 with a dynamic pressure sensor 52 at one end to produce a time varying pressure signal TP on the line 53, which is one input to a data acquisition system 54. One end of the pressure probe 50 is inserted into the borescope inspection port 10a to tap the compressor gas flow. The dynamic pressure sensor 52 is located on the other end of the pressure probe 50 and the signal TP manifests the pressur (fluctuations) within the probe, hence the pressure of the compressor flow. Compressor rotor disk speed or rotational frequency N2 is transmitted over the line 57, providing a second input to the to the data acquisition system 36, which provides an indication of compressor pressure vs. N2 on a monitor 58. The data acquisition system can be assumed to be programmed with a software package capable of measuring the amplitude of the fluctuations in signal TP at N2 as a function of time during the engine operation as a function of time and providing electrical signals that represent those amplitudes at different values for N2.

Figure 5:
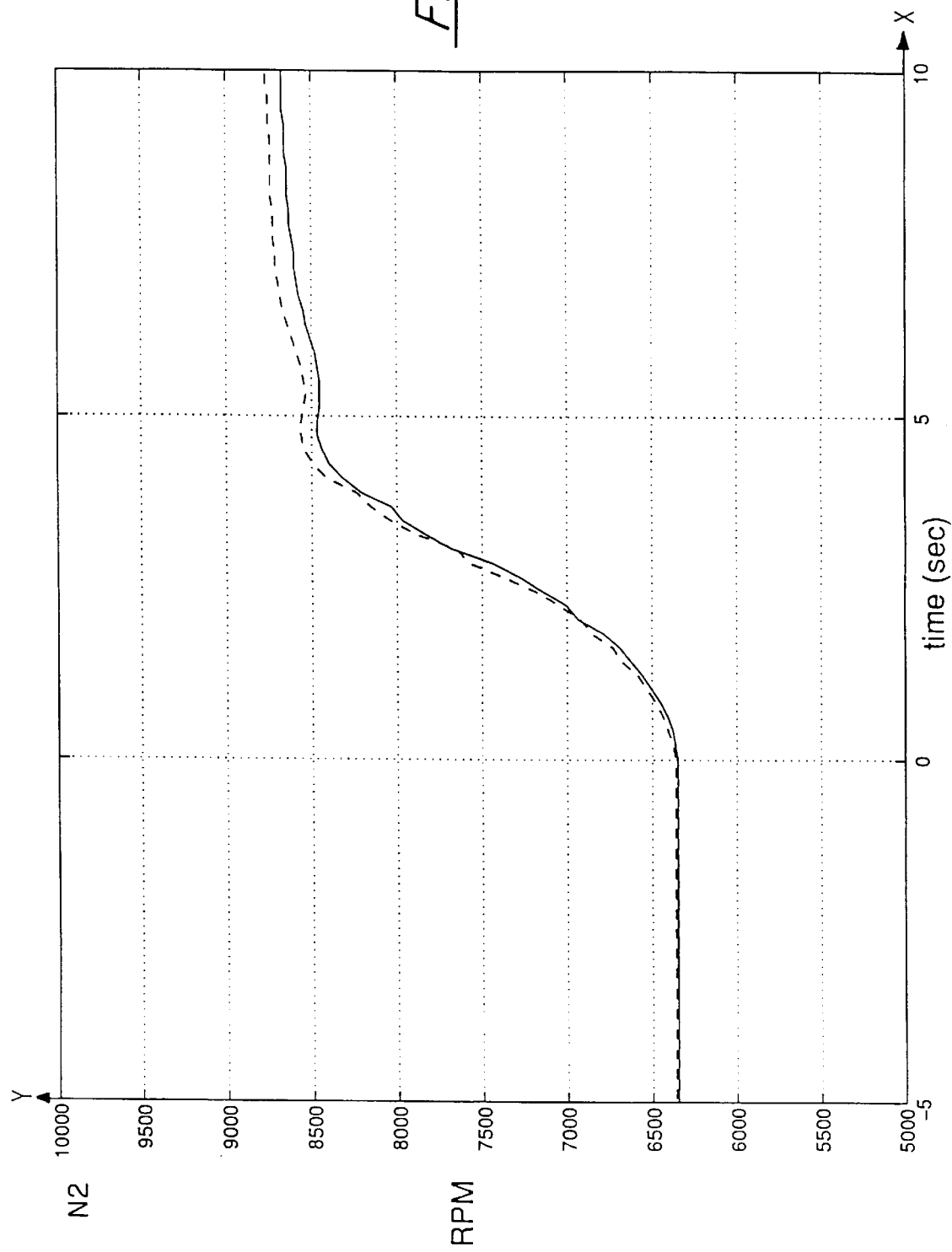
FIG. 5 is a graph of the acceleration of a gas turbine from an idling condition to a low power condition.

During the actual testing, the gas turbine engine 10 remains at an idle setting for approximately 20 minutes. The cool engine is then rapidly accelerated to a low power level. The graph of FIG. 5 plots the acceleration transient of a gas turbine engine. The Y-axis represents N2 in rotations per minute (rpm) during the acceleration transient. The X-axis represents time in seconds (sec) that it takes the gas turbine engine to achieve the particular frequency, where zero (0) seconds is defined as the start of the engine acceleration transient.

The value of N2 changes continuously during the acceleration transient. The data acquisition system 54 tracks N2 and compiles the amplitude of pressure fluctuation at those rotor frequencies as the engine accelerates. The data acquisition system plots on monitor 58 the amplitude of pressure fluctuations occurring within the compressor 12 at the rotational frequency of the rotor disk 22 during the initial acceleration transient.

Figure 6:
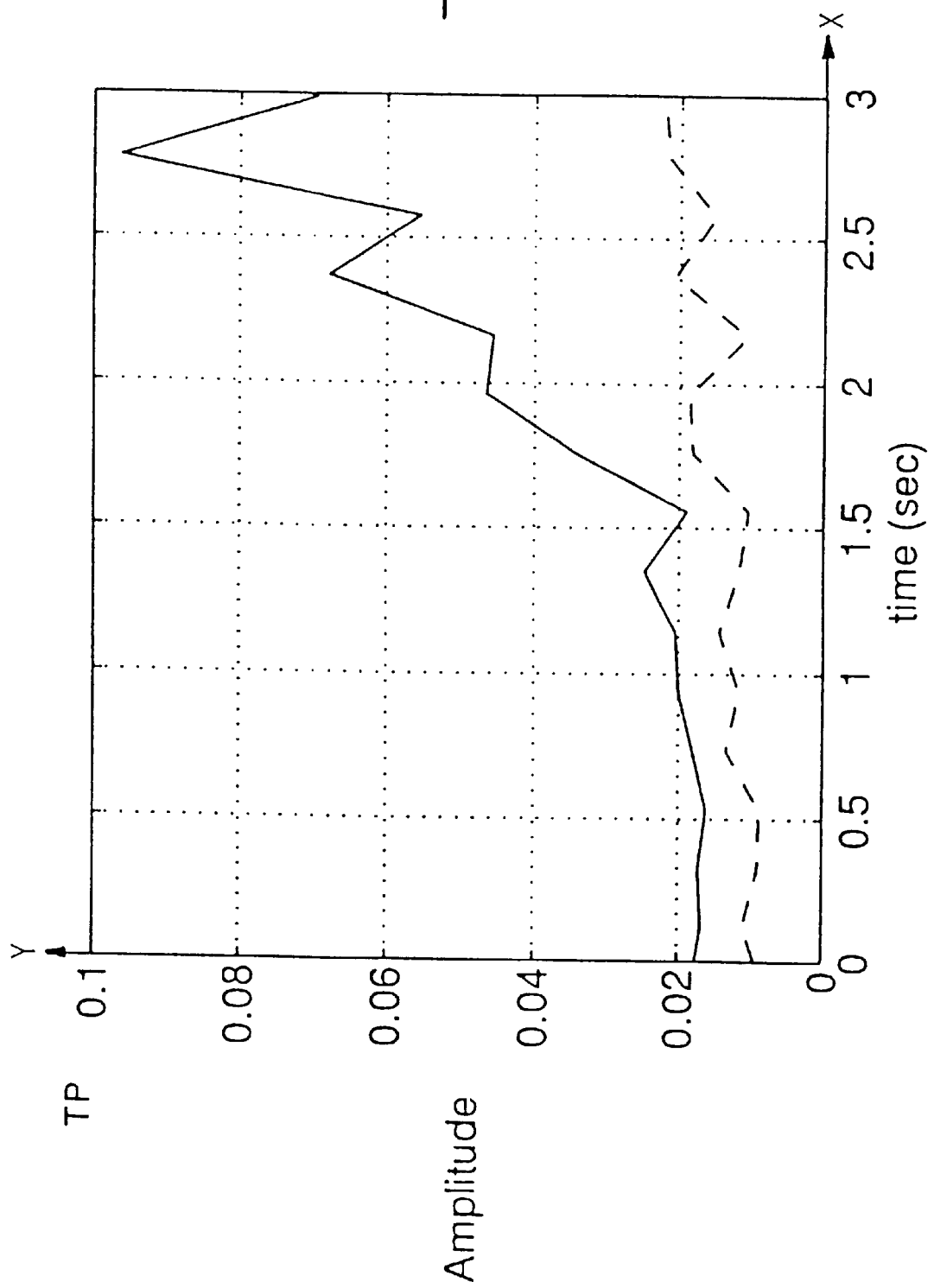
FIG. 6, a plot of amplitude of the pressure fluctuations within a compressor at N2 as a function of time during the engine acceleration transient shown in FIG. 3, shows a possible change in the transients characteristics as compressor components wear, e.g., before and after compressor refurbishment.

FIG. 6 illustrates the plot of the pressure fluctuations (amplitude of signal TP) at the rotational frequency of the rotor disk (Y-axis) as a function of time (X-axis) during the initial three (3) seconds of the acceleration transient described above, starting at time zero (0) seconds. The dashed line represents the response of a healthy engine with a known high stall margin. The solid line defines the response of a deteriorated engine, one prone to stalls and/or surges with a known low stall margin. The magnitude of amplitude of the pressure fluctuation can be correlated to engine health. The data gathered over time makes it evident that the amplitude of pressure disturbance measured at the rotor frequency N2 is several times smaller in healthy engines than in engines prone to stalls and/or surges. A substantial rapid change in the amplitude of disturbance at the rotor frequency is also a good indication that the engine has deteriorated.

From this type of analysis, an upper threshold can be established to determine if a particular compression system is healthy. The upper threshold can be established by measuring the amplitude of the pressure fluctuations at the rotor frequency of an engine with a known low stability margin. Once the upper threshold is established, the amplitude of pressure fluctuations at the rotor frequency of other engines can be compared to the pre-established upper threshold. Such comparison allows differentiation between a healthy engine and an engine prone to stalls and/or surges. Such diagnoses can be made by monitoring the pressure disturbances at the rotor frequency during a particular transient maneuver while the engine remains on the wing of a grounded or parked aircraft. Generally, an engine having a maximum amplitude of pressure fluctuation at the rotor frequency that approaches the upper threshold would need of refurbishment. Refurbishment is known to lower the maximum amplitude of pressure fluctuation at the rotor frequency and therefore, lower the likelihood of a stall and/or surge.

Figure 7:
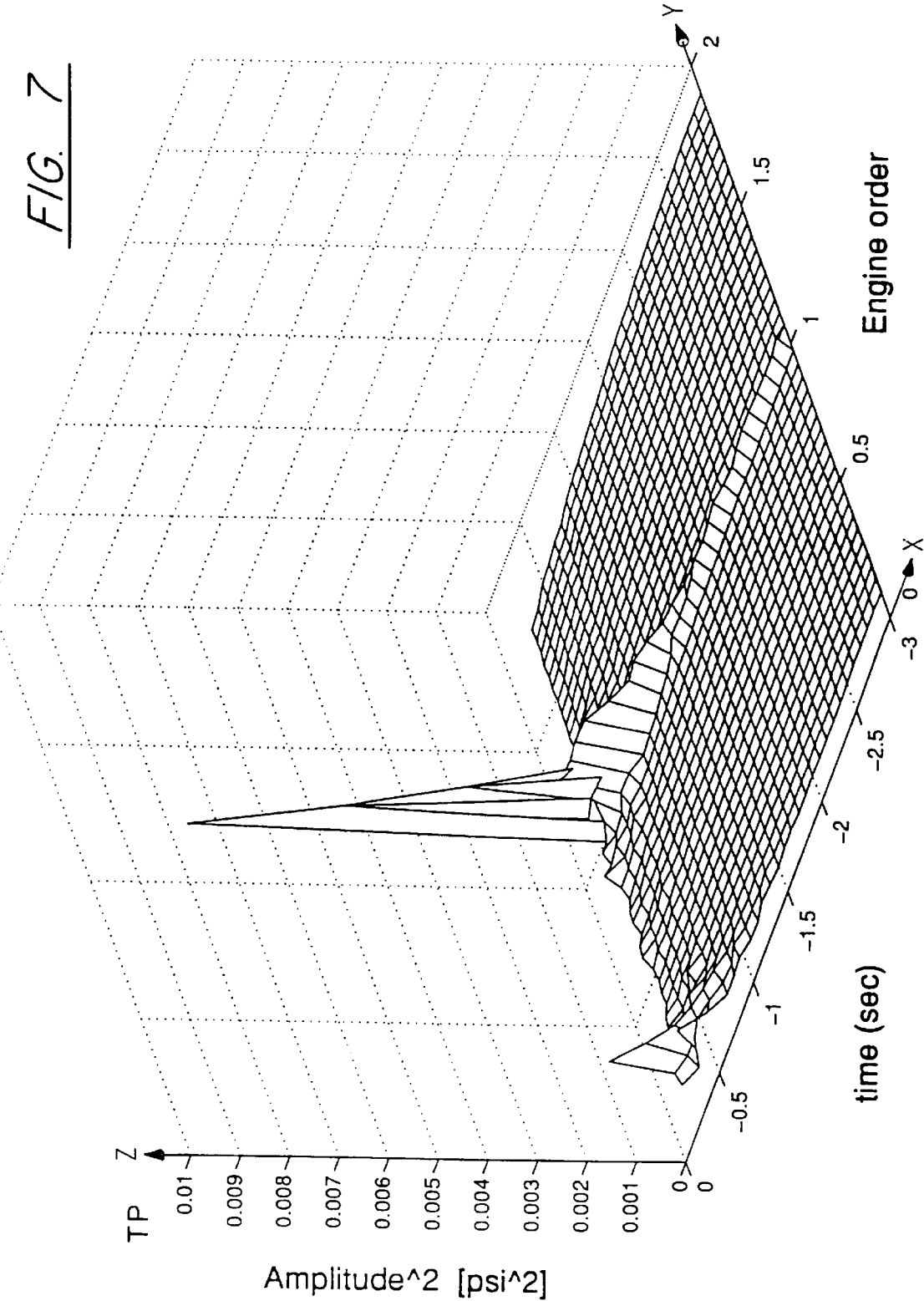
FIG. 7, a three dimensional plot of the magnitude of the pressure fluctuations and N2 and the duration of the fluctuation, shows the pressure fluctuations at N2 that are used for engine diagnostics according to the present invention.

Referring to FIG. 7, at the rotational frequency of the rotor disk the pressure fluctuations (the signal TP) appear hundreds of rotor revolutions prior to an actual stall and/or surge. In FIG. 7, the X-axis shows the time in seconds before the stall, the stall and/or surge occurring approximately at zero (0) seconds. The Z-axis shows the strength of the pressure disturbance in pounds per square inch squared (psi$^2$) or amplitude squared. The Y-axis indicates the engine order, the frequency of the pressure fluctuation (the value of TP) divided by N2 (the rotational frequency of the rotor disk), the value one (1) being the rotational frequency of the rotor disk and one half (0.5) being one half of the rotational frequency of the rotor disk. This demonstrates that the pre-stall pressure disturbance at N2 can be detected a few seconds in advance of the stall and/or surge. The value of N2 in this example is approximately one hundred (100) revolutions per second. Thus, monitoring the pressure fluctuations at N2 detects the pre-stall condition several hundred rotor revolutions prior to an actual stall.

Figure 8:
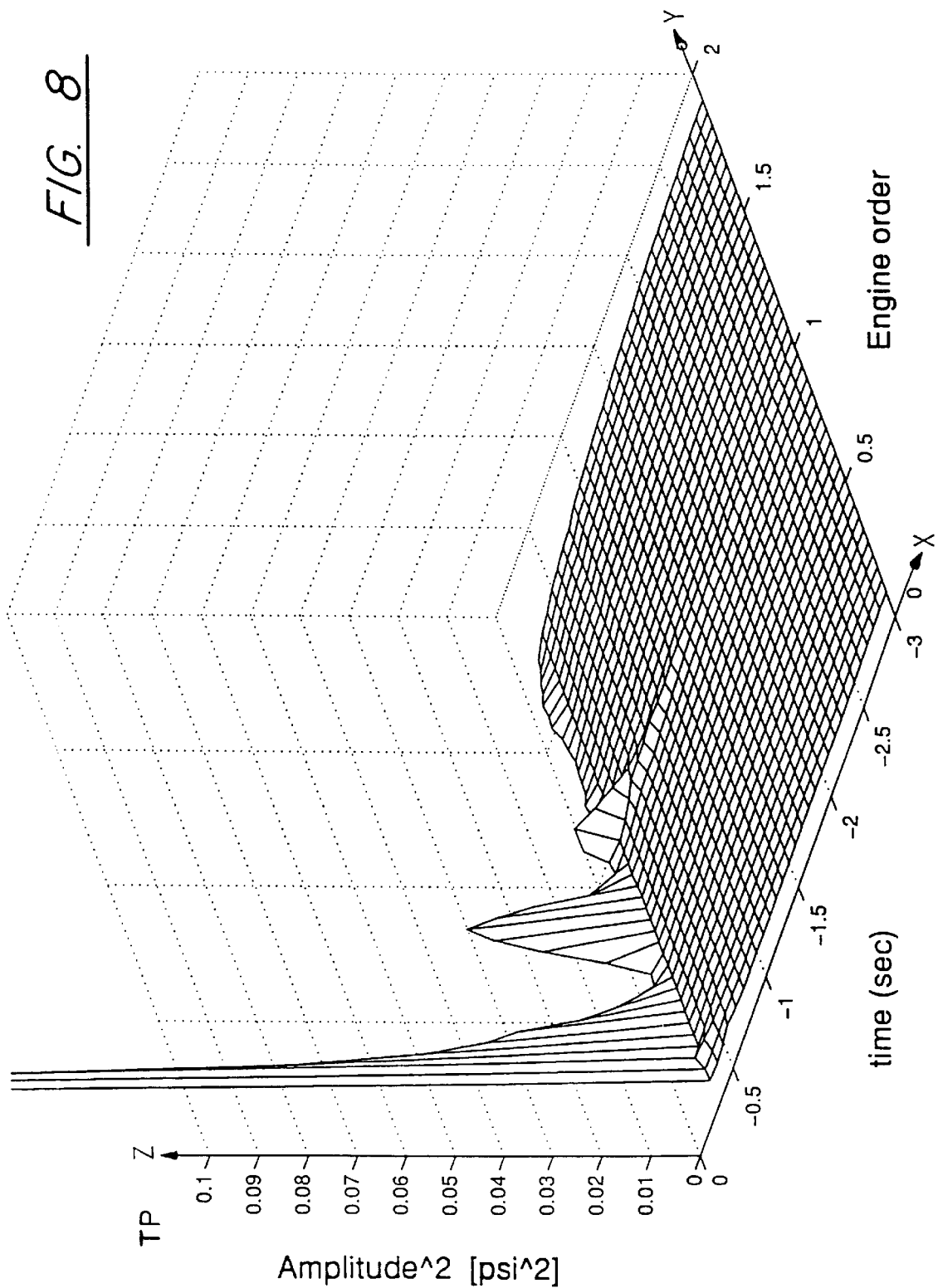
FIG. 8, a three dimensional plot of the magnitude of the pressure fluctuations and N2 and the duration of the fluctuation, shows the pressure fluctuations that typically appear at lower frequencies (below N2) to which prior art stall detection devices typically respond.

Such early detection affords sufficient warning to take corrective action to prevent or minimize the stall and/or surge. The state of the prior art has concentrated on monitoring pressure fluctuations at 30–70% of the rotational frequency of the rotor disk, or 0.3–0.7 of the engine order shown on Y-axis. As can be seen in FIG. 8, the prior art technique allowed warning of the upcoming stall and/or surge merely a few rotor revolutions in advance of the actual stall. FIG. 8 is analogous to FIG. 7, but is scaled to show rotating stall disturbances at approximately one half (0.5) or fifty percent (50%) of the rotational frequency of the rotor disk.

The preferred embodiment described herein used an unsteady pressure quantity as a form of measurement. Other unsteady flow parameters can be monitored to predict the onset of a stall and/or surge and to diagnose the health of the engine. For example, gas density, velocity, temperature, or any other unsteady flow quantity can be monitored to determine the onset of the stall and/or surge. The velocity can be measured by using hot wire anemometers or a pitot-static tube. The temperature can be measured by using a fine wire thermocouple.

The engine can be subjected to a particular transient mode and an upper threshold can be established, but as long as the unsteady flow fluctuations are monitored at N2, an accurate sign of reduced stall margin and engine health will be produced. The test or diagnostic equipment described and depicted in FIG. 2 is an example of test equipment that can be used to monitor the amplitude of pressure fluctuations according to the invention. Other equipment can be substituted for monitoring the pressure fluctuations within the compressor. For example, the data acquisition system can be either a digital data acquisition system, digital tape, FM analog tape or any other type of a system having capability of recording the pressure disturbances (sensor output) with sufficient frequency bandwidth to resolve the disturbances to rotational frequency of the rotor disk. For example, software packages that can be used in the analysis of the pressure and rotor speed data are MATAB® program, by The Math Works, Inc. of Natick, Mass., and the SNAP-MASTER® setup program by Hem Data Corporation of Southfield, Mich. DAQBOOK® data acquisition hardware made by Iotech of Cleveland, Ohio has been used to produce the outputs with those programs.

The invention has been shown and described with respect to exemplary embodiments, but it will be understood by those skilled in the art that various changes, additions and combinations of the features, components and functions that have been disclosed and explained may be made without departing from the true scope and spirit of the invention.

What is claimed is:

1. A controller for a rotary compressor having a compressor bleed valve, characterized by:

first means for providing a first time varying signal manifesting compressor pressure, second means for providing a second signal manifesting the magnitude of said first signal between a first frequency that is less than compressor rotational speed and a second frequency that is greater than or equal to said compressor rotational speed; and signal processing means for providing a first processor signal from said second signal that manifests a difference between the magnitude of said second signal and a stored value for said second signal, for integrating said difference to produce a control signal, and for producing a bleed signal to open the compressor bleed valve if said control signal exceeds threshold value.

2. The controller described in claim 1, further characterized in that said first means comprises a static pressure sensor located in a compressor stage.

3. The controller described in claim 1, further characterized in that:

said signal processing means comprises means for producing said bleed signal for a selected time interval.

4. The controller described in claim 1, further characterized in that said second means has 2-pole roll-offs at said first and second frequencies.

5. The controller described in claim 1, further characterized in that said first frequency is 0.1 of compressor rotational speed.

6. The controller described in claim 1, further characterized in that said first frequency is between 0.01 and 1 times said rotational frequency and said second frequency is between 1 and 10 times said rotational frequency.

7. The controller described in claim 6 further characterized in that said signal processing means comprises means for producing said bleed signal for a fixed time interval.

8. The controller described in claim 1 further characterized in that said signal processing means comprises means for changing the magnitude of said recalled value to a temporary value as said bleed signal is produced.

9. The controller described in claim 8 further characterized in that said temporary value is less than the magnitude of said recalled value when said bleed signal in not produced.

10. A method for avoiding stall in a rotary compressor, characterized by:

sensing the magnitude of the time varying characteristics of compressor flow at a bandwidth around the rotational frequency of the compressor;

producing an integral value by integrating the difference between said magnitude and design value for said magnitude; and increasing compressor mass flow when said integral value exceeds a threshold value.

11. The method described in claim 10, further characterized by increasing mass flow for fixed duration of time.

12. The method described in claim 10, further characterized by reducing said design value while said integral value is produced.

13. The method described in claim 10, further characterized in that said bandwidth has lower frequency roll-off at 0.01 to 1 times said rotational frequency and an upper frequency roll-off at 1 to 10 times said rotational frequency.

* * * * *